(No Model.)

S. COUTANT.
APPARATUS FOR FINISHING OR DRESSING BRICK.

No. 275,888. Patented Apr. 17, 1883.

WITNESSES:

INVENTOR:
S. Coutant
BY Munn & Co
ATTORNEYS.

UNITED STATES PATENT OFFICE.

STEPHEN COUTANT, OF KINGSTON, NEW YORK.

APPARATUS FOR FINISHING OR DRESSING BRICK.

SPECIFICATION forming part of Letters Patent No. 275,888, dated April 17, 1883.

Application filed October 11, 1882. (No model.)

*To all whom it may concern:*

Be it known that I, STEPHEN COUTANT, of Kingston, in the county of Ulster and State of New York, have invented a new and Improved Apparatus for Finishing or Dressing Bricks, of which the following is a full, clear, and exact description.

In the manufacture of bricks, after being molded, they are placed on edge to allow of drying, and previous to their being burned it is usual to go over the bricks with a hand-tool, called a "spatter," for removing rough edges and refuse from them. This work is slow and tedious, and in case the bricks are not set up squarely the edges are not properly finished by the spatter.

The object of my invention is to provide an apparatus for dressing or finishing bricks, by which the work usually done with a hand-spatter may be performed rapidly and with accuracy, so that the edges of the molded brick shall be made perfectly square, and all roughness and refuse entirely removed.

My invention consists in a frame carrying finishing and pressing rollers, which by the movement of the frame are caused to pass over and at the sides of the bricks, thereby properly dressing them, as hereinafter described.

Reference is to be had to the accompanying drawings, forming a part of this specification, in which similar letters of reference indicate corresponding parts in both the figures.

Figure 1:
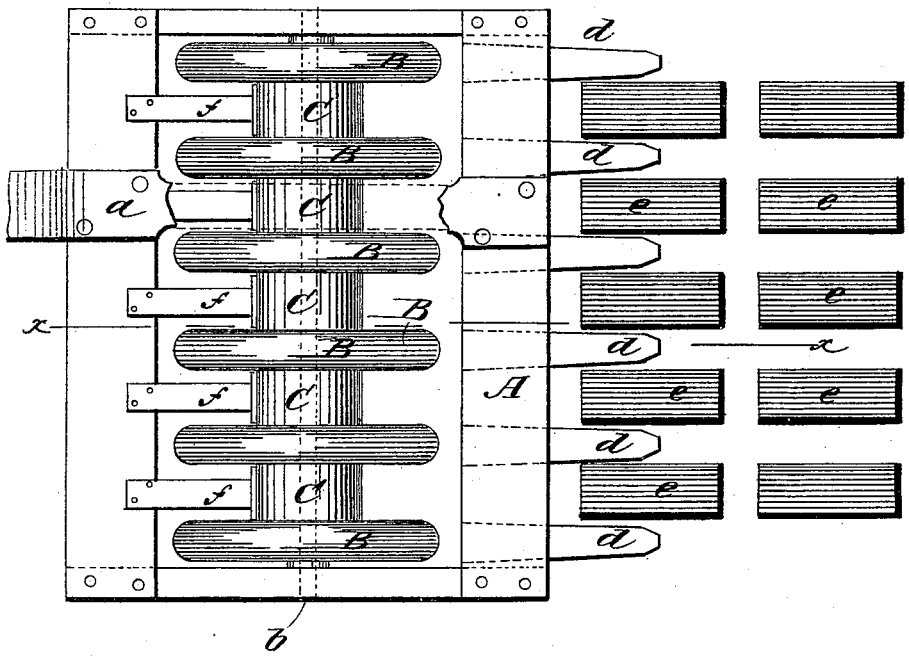
Figure 2:
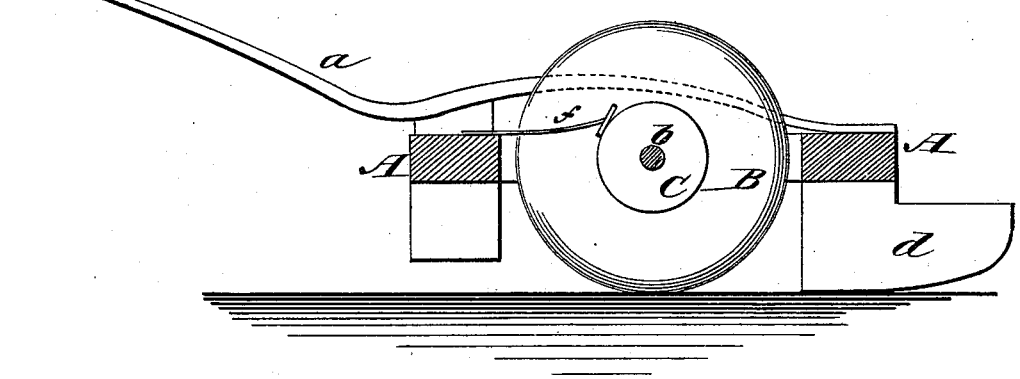

Figure 1 is a plan view of my improved apparatus. Fig. 2 is a sectional side view on the line $x\ x$, Fig. 1.

A is a frame of suitable character, provided with a handle, $a$, that extends to the rear for convenience in pushing the apparatus forward. Across the frame is fitted a shaft, $b$, on which are fixed press-rolls C and straightening-rollers B in alternate order. The straightening-rollers B are of any suitable diameter, and are formed with rounded edges, so as to prevent them from cutting into the brick. The press-rollers C are formed with a plain flat surface, and are smaller in diameter than the rollers B, the difference in diameter between the two rollers being just twice the width of the finished bricks, and the width of the rollers C being just the thickness of the finished bricks, so that a brick passed between any two of the rollers B and beneath a roller C shall be in contact with the rollers upon its top edge and sides. At the front of the frame A are fitted shoes $d\ d$, which are formed with beveled sides and placed so that the space between their outer ends is the wider, while the space between their inner ends is just sufficient for a brick to pass. These shoes act as pilots to straighten the rows of bricks, so as to place them in proper position for action by the rollers C D.

At $e$ are shown bricks placed on edge and arranged in rows in the usual manner for drying. To use the apparatus it is placed at the end of the rows, and is supported by the larger rollers, B, with the pilots $d$ entered between the rows of bricks. The apparatus then being pushed forward, the pilots $d$ pass between the rows and act to straighten the bricks in the rows. The larger rollers, B, pass between the rows and in contact with the sides of the bricks, while the press-rollers C pass over the upper edge of the bricks. The combined action of the two rollers is to press and smooth the bricks, removing all refuse and rough edges, and leaving the edges perfectly square and even. With this apparatus the work of pressing and finishing can be rapidly done and in a superior manner.

For keeping the surface of the press-rollers C clean and free from dirt, scrapers $f$ are provided. These are arms attached to the frame, and are fitted at their outer ends with rubber plates or blocks $f'$, bearing on the rollers.

Having thus fully described my invention, I claim as new and desire to secure by Letters Patent—

1. The apparatus for dressing or finishing bricks, consisting of the frame A, fitted with a suitable handle, and carrying a series of rollers, C B, substantially as shown and described.

2. In apparatus for dressing bricks, the combination, with the larger dressing-rollers, B, of the smaller press-rollers, C, placed side by side on a suitable frame, for operation as set forth.

3. In apparatus for dressing bricks, the pilot-shoes $d$, in combination with the frame carrying the dressing-rollers, substantially as shown and described.

STEPHEN COUTANT.

Witnesses:
C. R. N. CHAMPLIN,
A. K. COUTANT.